United States Patent [19]

Beglinger et al.

[11] Patent Number: 4,571,134
[45] Date of Patent: Feb. 18, 1986

[54] TWO-PIECE PLASTIC FASTENER AND APPARATUS FOR MOLDING SAME

[75] Inventors: Gregory O. Beglinger, Woodstock, Ill.; Edward P. Massof, Brighton, Mich.; Richard J. Schwind, Akron, Ohio

[73] Assignee: Phillips Plastics Corporation, Phillips, Wis.

[21] Appl. No.: 482,526

[22] Filed: Apr. 6, 1983

[51] Int. Cl.⁴ ............................................. F16B 13/04
[52] U.S. Cl. ..................................... 411/41; 411/509
[58] Field of Search ..................... 411/41, 39, 40, 42, 411/45, 57, 60, 508, 509, 510, 531, 545

[56] References Cited

U.S. PATENT DOCUMENTS

| | | | |
|---|---|---|---|
| 2,542,144 | 2/1951 | Kearns | 411/41 |
| 2,941,439 | 6/1960 | Rapata | 411/41 |
| 3,385,158 | 5/1968 | Morin | 411/45 |
| 3,411,397 | 11/1968 | Birmingham | 411/41 |
| 3,417,438 | 12/1968 | Schuplin | 411/41 X |
| 3,918,130 | 11/1975 | Poe | 24/453 |
| 4,085,651 | 4/1978 | Koscik | 411/41 X |
| 4,276,806 | 7/1981 | Morel | 411/41 |
| 4,405,272 | 9/1983 | Wollar | 411/45 X |
| 4,460,298 | 7/1984 | Solarz et al. | 411/15 |

Primary Examiner—Kenneth J. Dorner
Assistant Examiner—Adrian H. Whitcomb, Jr.
Attorney, Agent, or Firm—James E. Nilles; Thomas F. Kirby

[57] ABSTRACT

In a two-piece plastic fastener, initially molded as a unit, one piece is a grommet having a head with a flat front surface and forwardly projecting legs defining a sidewardly and forwardly opening slot; the other piece is a pin receivable through the head and forwardly slidable in the slot to an operative position holding the front ends of the legs flexingly diverged. As molded, a front end portion of the pin is connected with the head by a frangible flashing. A forwardly opening radially extending groove in the front of the head, opening from one side of the slot, defines a substantially flat forwardly facing groove surface that is rearwardly offset from and parallel to the front surface of the head and is flush with the front end surface of the pin. Cooperating ridges on the grommet legs and the pin confine the latter to lengthwise motion between the legs. In the molding apparatus, an elongated core element, lengthwise movable in mold-opening and mold-closing directions, defines the groove, the front end surface on the pin, and the rear portion of the slot.

4 Claims, 26 Drawing Figures

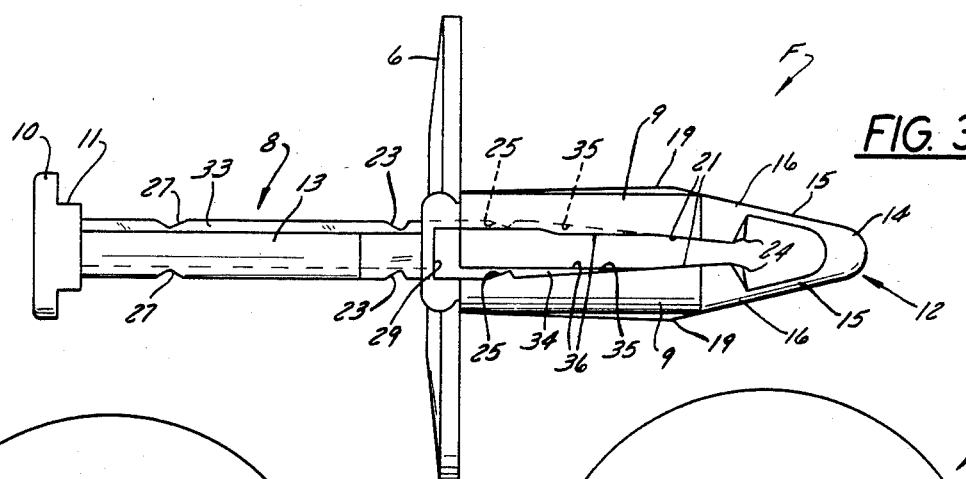
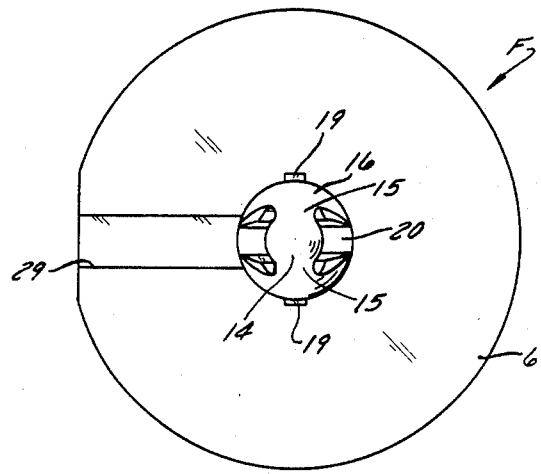
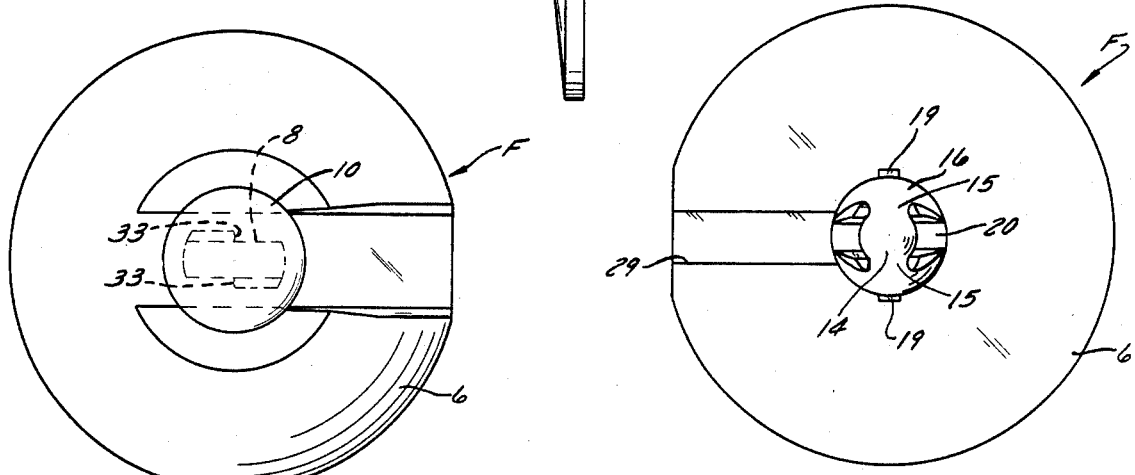
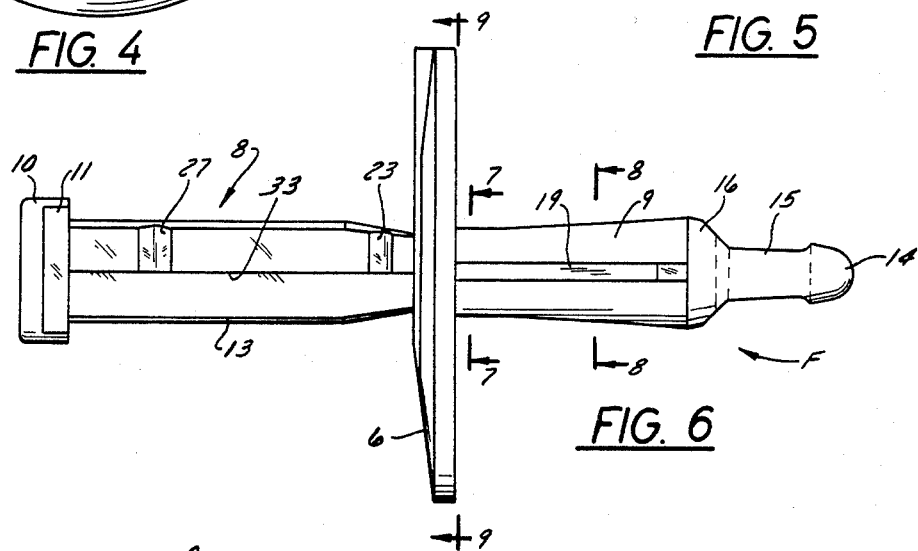
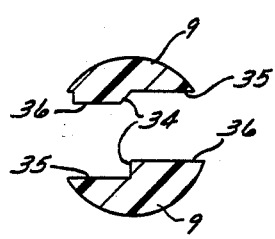
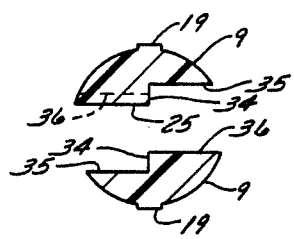

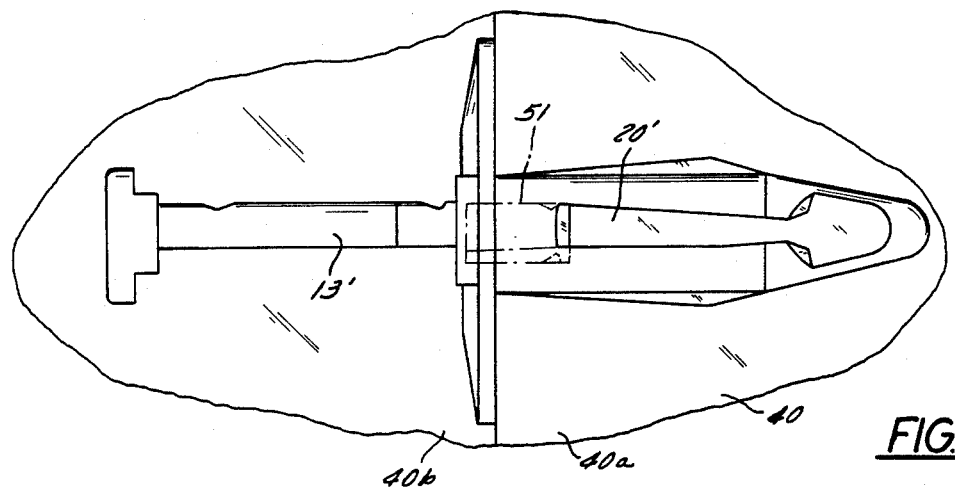
FIG. 20
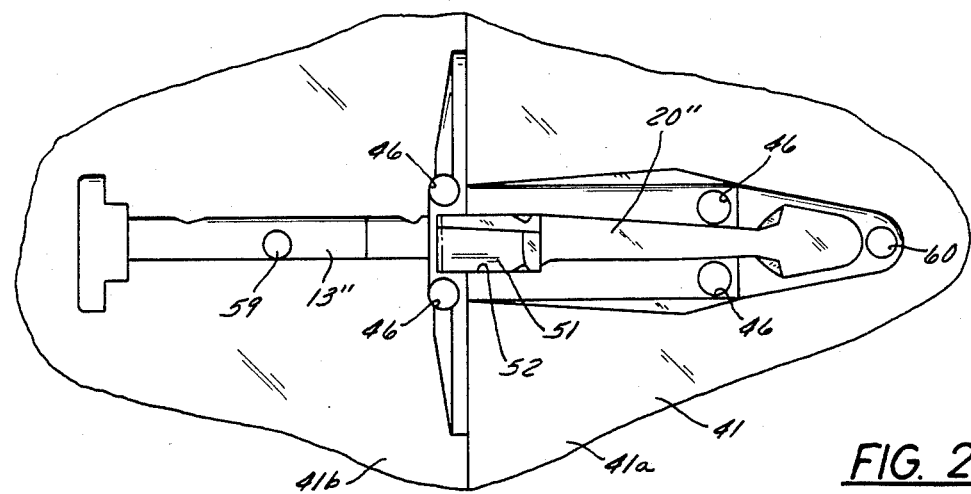
FIG. 21
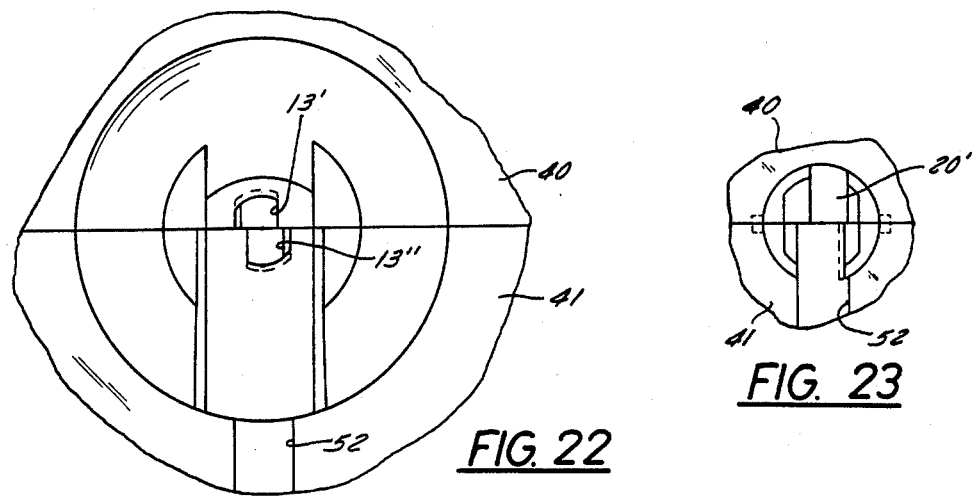
FIG. 22
FIG. 23

TWO-PIECE PLASTIC FASTENER AND APPARATUS FOR MOLDING SAME

FIELD OF THE INVENTION

This invention relates to two-piece plastic fasteners wherein one piece comprises a grommet body having a head from which resilient legs project forwardly and the other piece is a plunger-like pin that is receivable through the head for lengthwise forward motion between the legs to an operative position at which the pin holds the legs diverged; and the invention is more particularly concerned with a two-piece plastic fastener that can be readily molded in one piece, with a frangible flashing connecting the pin and the grommet body, and capable of being produced by means of simple equipment having mold parts that move only in one pair of opposite directions.

BACKGROUND OF THE PRIOR ART

Two-piece plastic fasteners of the general type to which this invention relates are exemplified by the following U.S. Patents: U.S. Pat. No. 2,941,439, issued in 1960 to G. M. Rapata; U.S. Pat. No. 2,542,144, issued in 1951 to H. Kearns; U.S. Pat. No. 4,276,806, issued in 1981 to H. Morel; U.S. Pat. No. 3,417,438, issued in 1968 to J. T. Schuplin; and U.S. Pat. No. 3,385,158, issued in 1968 to L. H. Morin.

The prior patent that is probably best illustrative of the problems confronted and solved by the present invention is U.S. Pat. No. 3,918,130, issued to L. R. Poe in 1975. In general, the fastener of that patent comprises a grommet body having a head and a bifurcated shank that projects forwardly from the head and comprises a pair of legs that are laterally spaced from one another. After the grommet body has been inserted into aligned holes in a pair of workpieces that are to be fastened together, a plunger-like pin is driven forwardly through the head and between the legs to an operative position at which the front end portion of the pin holds the legs diverged to prevent the fastener from backing out of the workpieces.

In certain of its embodiments, the fastener of the Poe patent has a so-called web that is connected between the front ends of the legs of its grommet body. The web tapers forwardly to provide a reduced, coaxially conical front end portion on the shank of the grommet. The patent assigns to this web a function which relates to the structural integrity of the grommet body itself, but the web obviously has another and very desirable function when the fastener is inserted into aligned holes in a pair of workpieces that it is intended to connect, in that the web serves as a pilot that smoothly guides the grommet shank into the holes, even if the holes are not in good register with one another or the fastener is brought towards the holes in somewhat off-center relation to them. Without such a piloting web, it often happens that the front end of one leg of a grommet shank gets caught against a surface of the workpiece alongside the hole. Since the fastener tends to be installed with a fast and vigorous jab, such a hang-up may deform the fastener, but it will in any event necessitate some further manipulation of the fastener. For the installation of one fastener, such a fumbling and delay would be inconsequential; but an operator who works with plastic fasteners often installs hundreds or even thousands of them during the course of a shift, and therefore any feature that facilitates insertion is significant in terms of both economics and morale.

The fastener of the Poe patent had another desirable feature, in that its grommet body and pin could be molded in one piece, connected by a readily frangible flashing. Molding the two parts of a fastener in one piece was not broadly new with Poe, having been generally disclosed, for example, in U.S. Pat. No. 3,411,397, issued to D. W. Birmingham in 1968 and in the above mentioned Rapata Patent U.S. Pat. No. 2,941,439. The fasteners of the Birmingham and Rapata patents had to be molded with the use of an elongated core-like mold element that extended axially between the grommet legs and defined the slot between them, projecting rearwardly into the grommet head to the front end of the pin, to define a pin receiving bore in the grommet head. This elongated core element had to be withdrawn axially forwardly from between the legs after the fastener was molded, whereas mold parts that defined the external surfaces of the fastener had to move apart laterally.

Molding equipment comprising an axially forwardly movable core element was obviously unsuitable for producing the fastener of the Poe patent in its above described embodiment, because of the web connecting the front ends of the legs. Poe's fastener was therefore configured for molding in a single piece without the use of movable cores or the like, but to achieve this objective Poe arranged the head of the grommet body to comprise two complementary parts that defined spaced apart opposing surfaces. In the unit as molded, flashings that connected the pin to the grommet body extended only along the opposing surfaces of the head parts. In one embodiment of Poe's fastener the two parts of the head were connected by a thin web, but that web was present only at one side of the pin; at the other side of the pin the two head parts were unconnected, leaving a very large radially extending slot-like gap between the head parts that was continuous with the slot between the legs. Furthermore, the thin web that connected the two head parts was adjacent to the front surface of the head, leaving a deep groove in the grommet head, at its side remote from the legs, that appeared to be a continuation of the slot-like gap in the head at the other side of the pin.

Once the flashings were broken in Poe's fastener, the pin could be driven partway forwardly in the grommet to a detent-defined retracted position, but in that position, owing to the gap in the head, the pin had a substantial amount of side play in the grommet and could be rather easily removed from the grommet by lateral movement through the gap in the head. To prevent separation of the pin from the grommet during shipment and handling, commercial versions of the Poe fastener were delivered to the user with the flashings unbroken. This posed problems for the user. The pin, as it was driven forwardly in the grommet, received insufficient axial guidance, owing to the large radially extending gap in the head and the ease with which the head parts could be flexed apart to enlarge that gap; and consequently the pin could readily skew out of coaxial relation to the grommet.

Other problems grew out of the capability of the head parts for flexing convergence and divergence about the small web that connected them. Directly under the head of the pin was a lug-like projection that was intended to enter the gap between the head parts when the pin was driven all the way forward in the grommet, thereby preventing convergence of the head portion of the grommet in response to forces that tended to produce relative shifting between workpieces connected by the fastener. However, if a fastener hole in a workpiece was slightly undersize, the grommet could be inserted easily enough into the hole, but the head parts would be held converged, narrowing the gap between them to block entry into that gap of the lug-like projection on the pin. Under these conditions, the pin could not be driven all the way forward to its operative position without the use of enough force to damage head portions of the grommet and the pin.

These problems with the fastener of the Poe patent were all due to the configuration of the grommet head, insofar as it was essentially formed in two distinct parts that were connected—if at all—by only a small web. (In one embodiment of the Poe fastener the parts of the head were connected with one another only very indirectly, by means of the web at the front ends of the legs.) In turn, the reason for forming the grommet head in two substantially separate parts was to enable production of the fastener by means of molding equipment that comprised no axially movable mold elements. The gap in the head allowed a laterally movable male mold element to define the front end surface of the pin and to core the aperture in the grommet head through which the pin moved forward as well as the slot between the legs of the grommet.

The fastener of the Poe patent has advantages—particularly with respect to low production costs—that have earned for it a certain amount of commercial success. On the other hand, such commercial success as it has enjoyed has clearly demonstrated and emphasized the problems that it presents, which impose rather stringent limits upon the applications for which it can be employed. Evidently it has not heretofore been obvious to those skilled in the art how the manifest deficiencies in the Poe fastener can be remedied without sacrifice of its clearly desirable features, and particularly its front web that serves as a pilot for its grommet shank and its capability for production by means of molding apparatus having mold parts that move only in a pair of opposite directions.

SUMMARY OF THE INVENTION

The general object of the present invention is to provide a two-piece fastener of the character described that combines all of the following desirable features that were heretofore regarded as being to a significant extent incompatible with one another:

A web or strap connecting the front ends of the legs of the grommet body, serving as a pilot that smoothly guides the fastener into a hole in a workpiece;

The head of the grommet body being unbroken around its circumference, to be in completely surrounding relation to the pin, so that the head guides the pin and confines it against skewing as the pin is driven forwardly, and so that the rear end portion of the grommet body, comprising the grommet head and its adjacent portions of the legs, is substantially rigid against laterally flexing expansion and contraction;

Capability for being molded as a unit that comprises the grommet body and the pin, connected by a frangible flashing; and Capability for being so molded by means of simple and inexpensive molding equipment comprising mold parts that move only in one pair of opposite directions.

A more specific but very important object of this invention is to provide a two-piece plastic fastener of the character described, capable of being molded as a unit having a frangible flashing that extends completely around the pin and integrally connects its front end with the grommet head, so configured that the pin can be driven partway into the grommet body to a preassembled position at which its removal from the grommet body is securely resisted but from which the pin can be readily pushed all the way forward to an operative position wherein it holds the grommet legs diverged.

Another specific but important object of the invention is to provide a two-piece plastic fastener of the character described that is capable of being produced by means of apparatus wherein mold parts move only in one pair of opposite directions, wherein one of said mold parts has a cavity that defines external surface portions of the fastener and another of the mold parts is a core-like element that moves both with and relative to said one mold part and functions as an ejector for dislodging molded units from said cavity in addition to serving as a core element of the mold itself.

It will be evident that it is also a general object of this invention to provide a two-piece plastic fastener that has a novel configuration which adapts it for production by means of simple and inexpensive molding equipment but which nevertheless involves no compromise with functional and performance characteristics.

In general, these and other objects of the invention that will appear as the description proceeds are achieved in a two-piece plastic fastener wherein one piece comprises a grommet having a head with a flat front surface and having a pair of laterally spaced legs that project forwardly from said head and define between them a sidewardly and forwardly opening slot. The other piece comprises a pin receivable through said head for lengthwise forward movement in said slot to an operative position wherein a front end portion of the pin holds the legs flexingly diverged. The fastener is initially molded as a unit wherein said two pieces are connected by a frangible flashing. The fastener of this invention is characterized by said head having a forwardly opening radially extending groove in its front surface that is substantially equal in width to said slot, opens unrestrictedly from one side of said slot and extends to the periphery of the head. Said groove defines a web-like portion of said head which is substantially thinner than the remainder of the head and which extends across and along said groove in rearwardly offset relation to the front surface of the head. Further, the pin in the fastener as initially molded has a front end surface that is substantially flush with the front surface of said web-like portion and has its front end portion connected with said head by a frangible flashing that extends substantially all around the pin and has a thickness substantially equal to that of said web-like portion.

In a preferred embodiment, there is a U-shaped pilot on the grommet, having a narrow bight portion at its front that is substantially concentric with said head and having rearwardly diverging legs, each connected at its rear end with one of the legs of the grommet. The bight portion of the pilot is preferably conical and forwardly tapering.

It is also preferred that the pin have a pair of oppositely facing lengthwise extending ridge surfaces thereon, one at each of a pair of opposite sides thereof, and that each leg of the grommet have a lengthwise extending ridge surface which opposingly engages a ridge surface on the pin, so that the several ridge surfaces cooperate to confine the pin to lengthwise movement between the legs.

Apparatus for molding the fastener as a unit wherein a front end portion of the pin is connected with said head by a frangible flashing is characterized by a pair of cooperating die members, each having a cavity that opens to a flat surface on the die member, one of said die members being movable relative to the other in a pair of opposite directions normal to its said surface, to and from a mold-closed position in which said surfaces are engaged. The cavity in each die member defines one longitudinally extending half of the said unit that includes a half of each of said legs of the grommet. The apparatus further comprises an elongated core element that is lengthwise movable in said directions with and relative to said one die member, which core element cooperates with said die members to define a rear portion of said slot, a front end surface on the pin, and a forwardly opening radially extending groove in the front of said head that opens unrestrictedly from one side of said slot and extends to the periphery of the head, which groove has a forwardly facing surface therein that is in rearwardly offset relation to said flat front surface of the head and is flush with said front end surface of the pin.

BRIEF DESCRIPTION OF DRAWINGS

In the accompanying drawings, which depict what is now regarded as a preferred embodiment of the invention:

FIG. 3 is a view in side elevation of the fastener as initially molded;

FIG. 4 is a view of the fastener in rear elevation, i.e., as seen from the left side of FIG. 3;

FIG. 5 shows the fastener in front elevation;

FIG. 6 is another view in side elevation of the fastener as initially molded, rotated about its axis through 90° from its position shown in FIG. 3;

FIGS. 7, 8 and 9 are views in cross-section, respectively taken on the planes of the lines 7—7, 8—8 and 9—9 in FIG. 6;

FIGS. 20 and 21 are detail views on an enlarged scale of the die halves, at the respective sides of the die cavity designated by the arrows 20 and 21 in FIG. 16;

FIGS. 22 and 23 are detail views of die members, taken on the mating plane of rigidly connected parts of the die members and looking in the respective directions designated by the arrows 22 and 23 in FIG. 16;

DETAILED DESCRIPTION OF PREFERRED EMBODIMENT OF THE INVENTION

Figure 15:
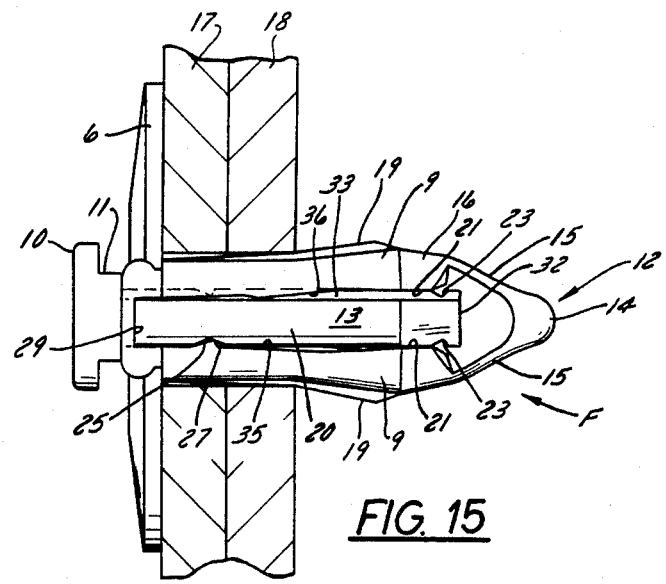
FIG. 15 is a view generally like FIG. 14, but showing the fastener installed in a pair of workpieces to be connected by it and with its pin driven all the way forward to its operative position.
Figure 9:
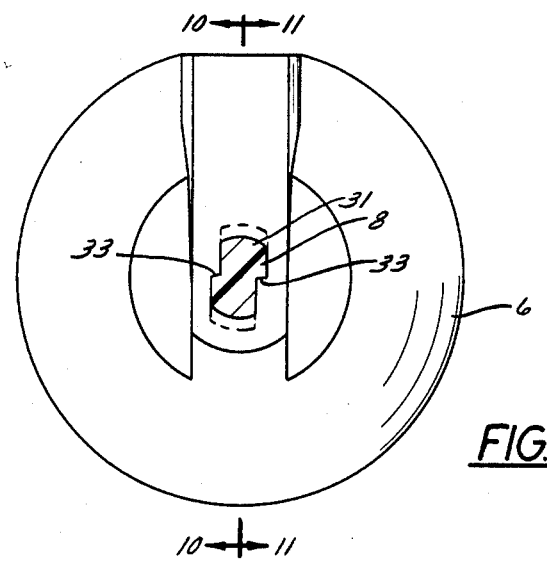
Figure 10:
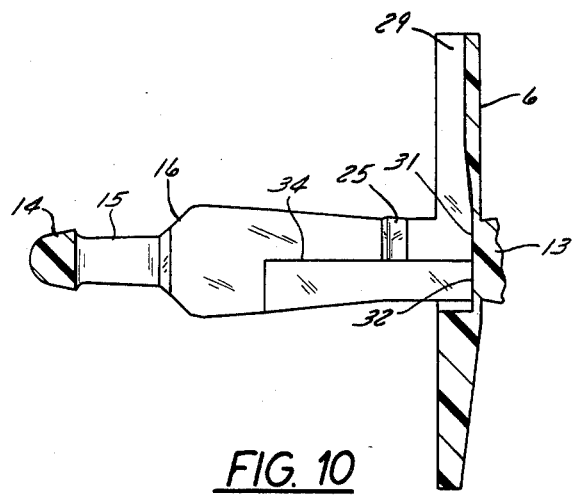
FIG. 10 is a view in longitudinal section of the fastener as initially molded (but with most of the pin omitted) taken on the plane of the line 10—10 in FIG. 9.
Figure 11:
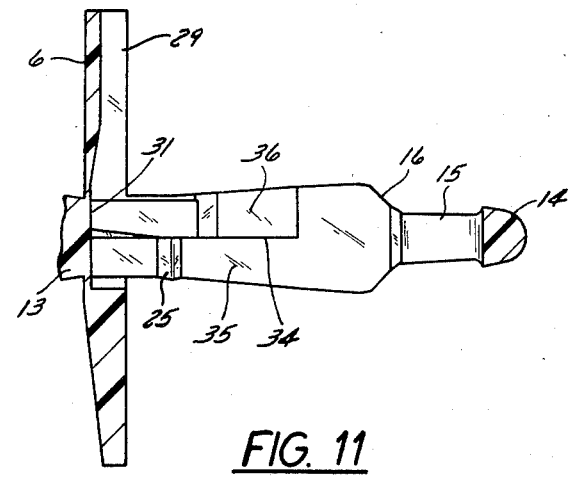
FIG. 11 is a view generally similar to FIG. 10, but taken on the plane of the line 11—11 in FIG. 9.
Figure 12:
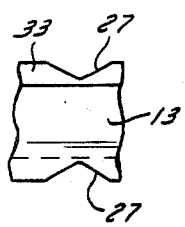
FIG. 12 is a detail view in side elevation of the pin stem in the vicinity of its rear detent grooves.
Figure 13:
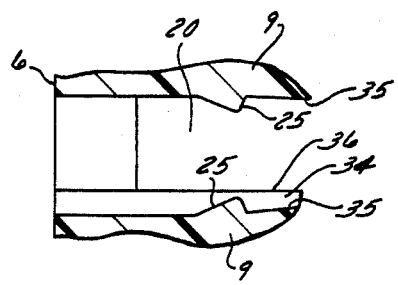
FIG. 13 is a detail view in longitudinal section through the legs of the grommet body in the vicinity of the detent lugs.
Figure 16:
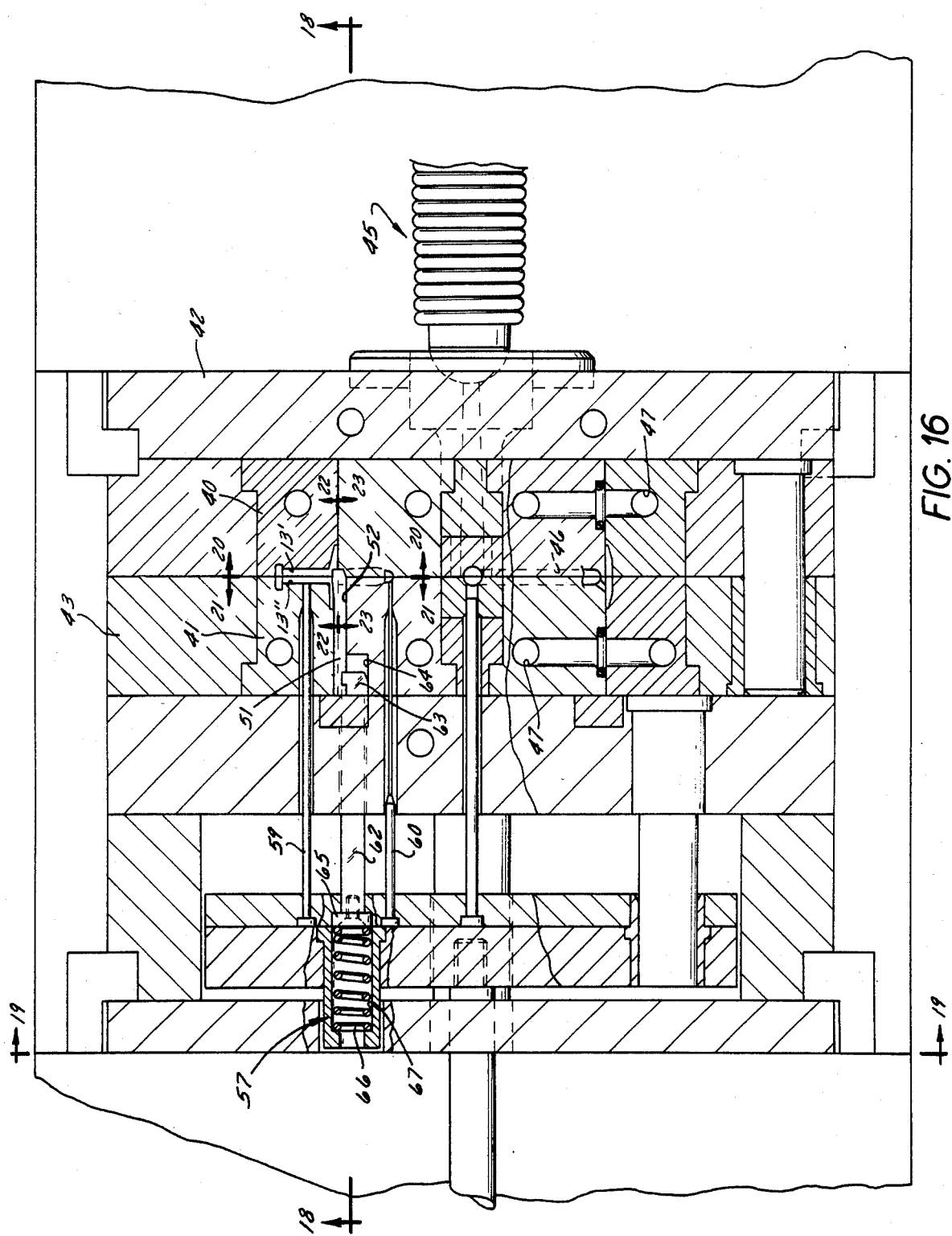
FIG. 16 is a view in section of molding apparatus for producing fasteners of this invention, with the die members shown in their positions for a molding operation, ready to receive an injection of molten plastic.
Figure 17:
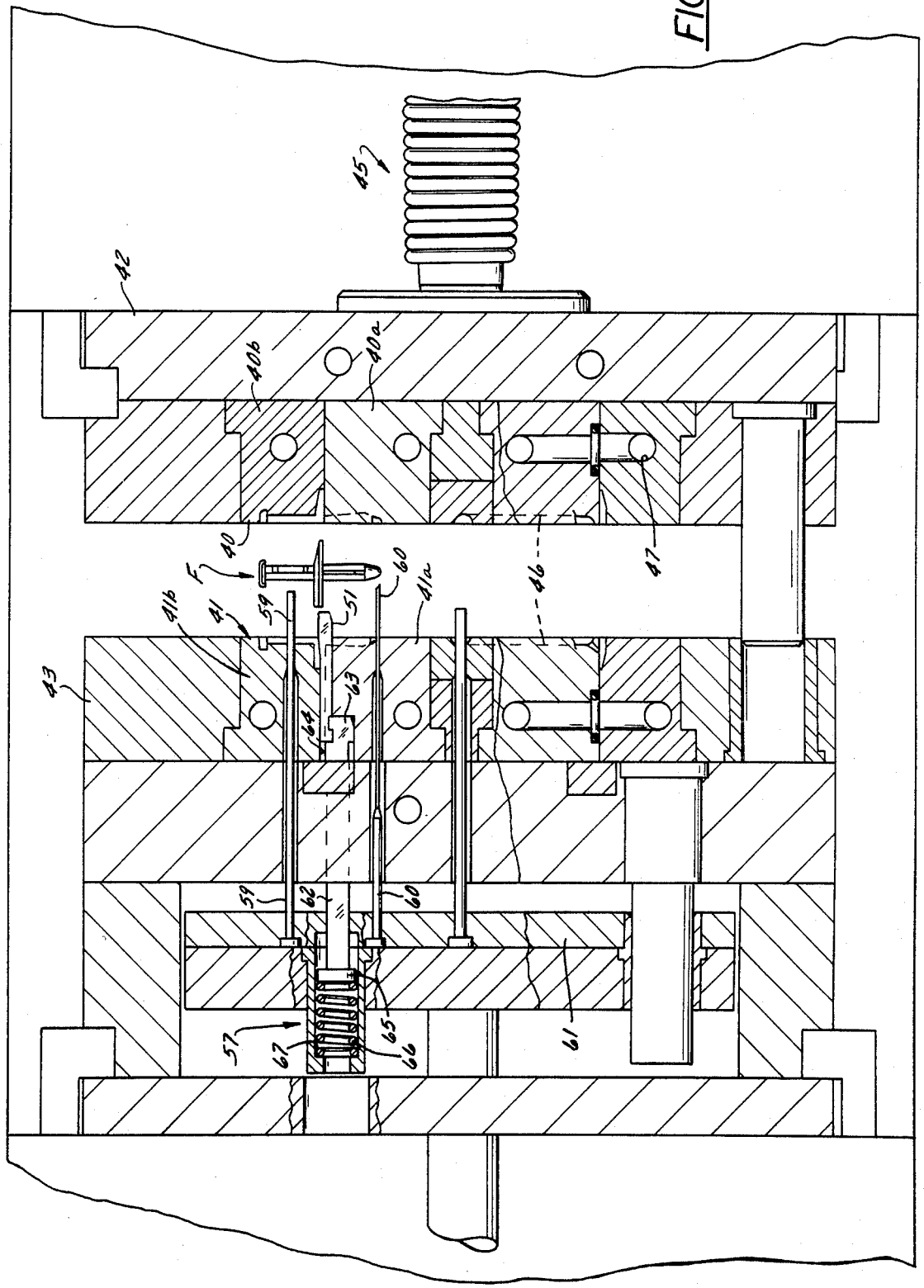
FIG. 17 is a view generally similar to FIG. 16, but showing the die members fully separated and a molded unit being ejected.
Figure 18:
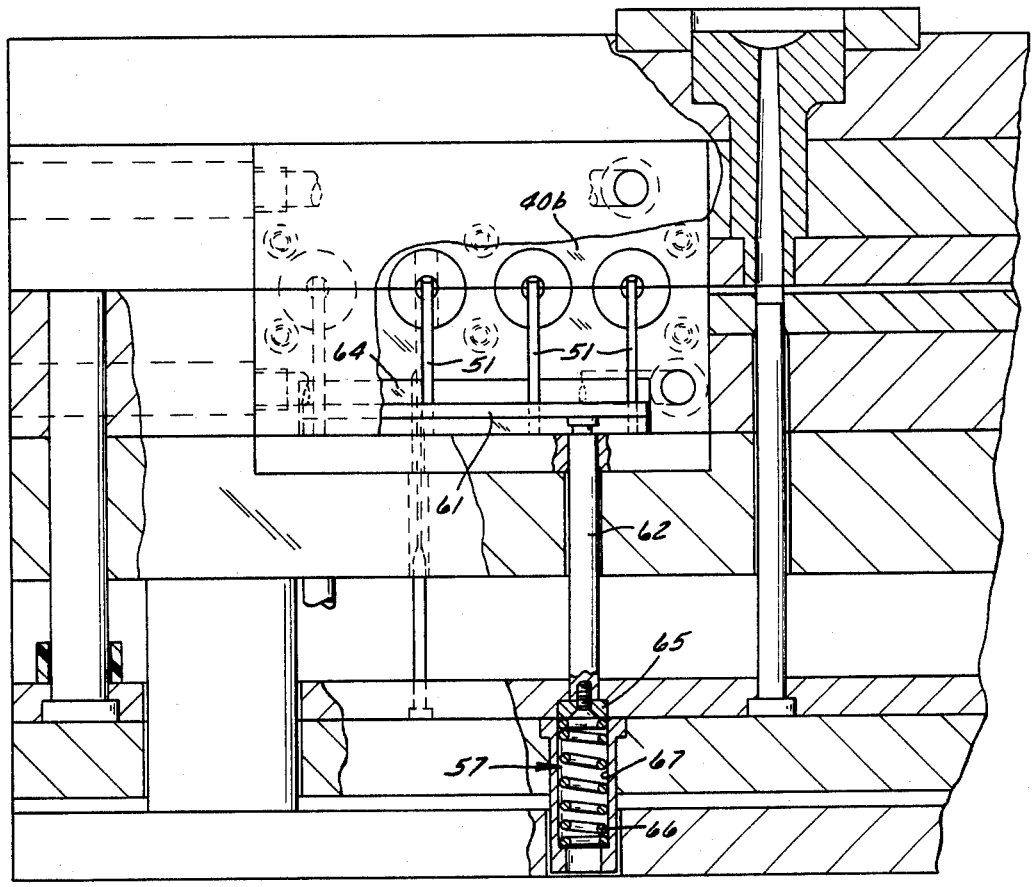
FIG. 18 is a view in section, generally on the plane of the line 18—18 in FIG. 16.
Figure 19:
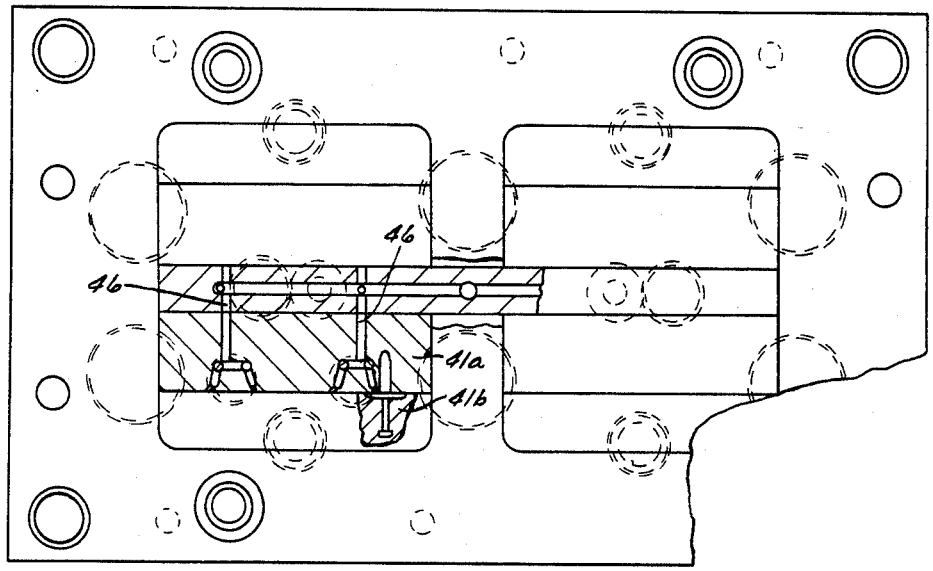
FIG. 19 is a view in elevation, taken from the left side of FIG. 16 and with portions shown broken away to illustrate the gates through which plastic is injected into the die cavities.

In a two-piece plastic fastener F of this invention, one of the pieces comprises a grommet 5 that has a generally disc-like head 6 and a concentric, forwardly projecting, bifurcated shank 7; and the other piece comprises a plunger-like pin 8 which is receivable through the head 6 and which can be pushed forwardly between the bifurcations or legs 9 of the shank 7 to an operative position (shown in FIG. 15) in which the stem 13 of the pin holds the front end portions of the legs 9 flexingly diverged. The pin 8 preferably has an enlarged head 10 at its rear end, to facilitate driving it forward in the grommet, and in the operative position of the pin its head 10 is closely adjacent to the rear surface of the grommet head 6. The head 10 of the pin can have a reduced diameter front portion 11, to facilitate rearward withdrawal of the pin from its operative position, for removal of the fastener from a workpiece.

A very desirable feature that is preferably incorporated in a fastener of this invention is a generally U-shaped pilot 12 on the front end of its grommet shank 7, formed in one piece with the grommet. The bight portion 14 of this pilot 12 is a more or less conical bullet nose, and its relatively slender strap-like legs 15 diverge rearwardly and are connected at their rear ends with the front ends of the legs 9 of the grommet shank 7. The front end portion of the grommet shank 7 has a frustoconical outer surface 16 that has a taper continuous with the external surfaces of the pilot legs 15 and the bullet nose 14. It will be evident that the front end portion of the grommet 5, including the pilot 12, is configured for easy entry into registering holes in a pair of workpieces 17, 18 (FIG. 15), even if the holes are substantially out of alignment with one another and/or if the fastener is substantially out of coaxial relation to the holes at the start of its insertion into them.

Figure 1:
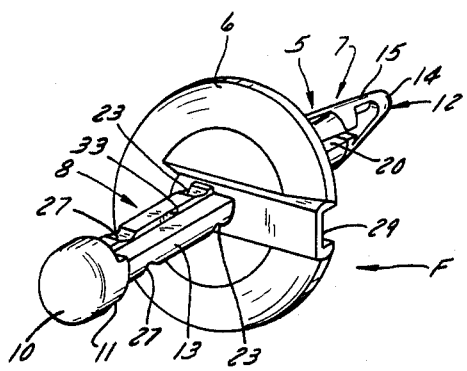
FIG. 1 is a perspective view of a fastener of this invention, as initially molded, as seen from the rear of it.
Figure 2:
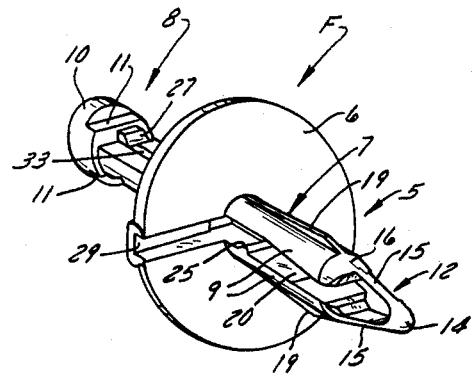
FIG. 2 is a front perspective view of the fastener as initially molded.

With the pin 8 well to the rear of its operative position and the legs 9 of the grommet shank 7 relaxed (e.g., FIGS. 2, 3, 14), the grommet shank has an outside diameter that is, in the main, substantially uniform along its length, from its head 6 to the beginning of the taper 16 on the frustoconical front end portions of its legs. However, along each leg, at its side remote from the other leg, there extends a rearwardly tapering rib 19 that gives the shank an effective maximum width just behind its conical front end portion and whereby the grommet, upon initial insertion into a workpiece, is restrained against withdrawal from it.

The legs 9 of the grommet shank are laterally spaced apart to define a slot 20 that opens sidewardly through the shank and extends forwardly in it from the grommet head 6. This slot 20 narrows towards the front ends of the legs 9. More specifically, the front portions of the grommet legs have opposing inner cam surfaces 21 that are forwardly convergent, so that as the stem 13 of the pin 8 is driven forwardly between the legs 9 to its operative position, it flexes the legs apart, holding the legs diverged to securely retain the grommet in connected workpieces 17, 18, as illustrabed in FIG. 15.

Figure 14:
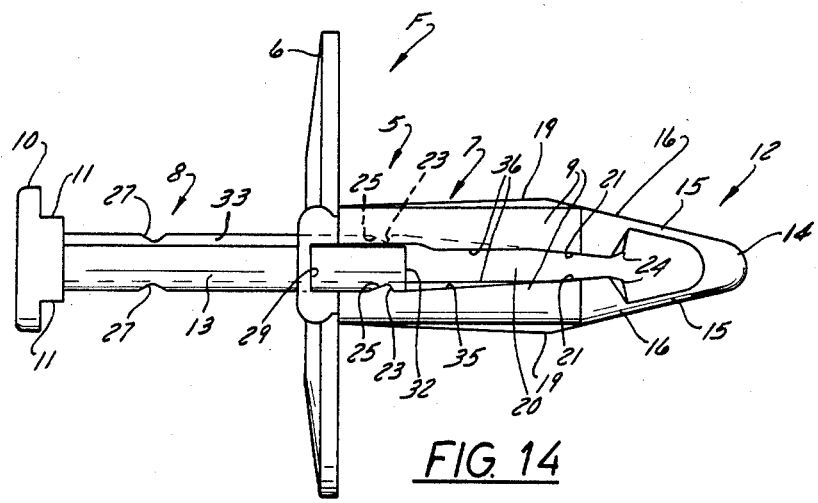
FIG. 14 is a view generally like FIG. 3 but showing the pin driven partway into the grommet body to its preassembled position.

With the exertion of a substantial rearward force upon the head 10 of the pin, the pin can be drawn back from its operative position to a detent defined preassembled position, illustrated in FIG. 14, wherein the grommet legs 9 are relaxed so that the fastener can be withdrawn from workpieces in which it has been installed. The preassembled position of the pin is defined by laterally opening notches 23 in the pin, near its front end, in cooperation with detent lugs 25 that project inwardly from the opposing faces of the grommet legs 9 and are located just in front of the grommet head 6.

In the operative position of the pin, its notches 23 receive the front inner corners 24 of the grommet legs. Those corners 24 can be beveled or rounded, as shown, so that they do not substantially resist rearward withdrawal of the pin to its preassembled position; or if the fastener is intended for non-removable installation, the leg corners 24 can be substantially square so that their engagement in the notches 23 securely resists rearward withdrawal of the pin. In either case, the operative position of the pin is detent defined by engagement of the lugs 25 in a second pair of laterally opening grooves 27 in the stem 13 of the pin, located a short distance forward of its head 10.

As initially molded, the fastener of this invention is in one piece (as shown in FIGS. 3 and 6) wherein the front end of the pin 8 projects into the grommet head 6 by a few thousandths of an inch and is integrally connected with the head. The axially short zone where the pin and the grommet head 6 are thus united comprises a frangible flashing that extends completely around the stem 13 of the pin and is readily broken by a forward force upon the pin. The fastener could be delivered to the user with the flashing intact, but a substantially higher force is needed to break the flashing than to drive the pin from its preassembled position to its operative position. Furthermore, the pin is adequately resistant to both rearward and lateral displacement from its preassembled position. Preferably, therefore, the pin is driven to its preassembled position as a step in the production process, by means of a known type of automatic machine, not shown.

A novel and important feature of the fastener of this invention, the significance of which will become clear as the description proceeds, is that its grommet head 6 is formed with a radially extending forwardly opening groove 29 in its front surface, which is otherwise flat. This groove 29 has the same width as the slot 20 through the shank, opens unrestrictedly from one side of that slot, and extends out to the periphery of the head 6. It defines in the grommet head 6 a relatively thin, flat web 31 which extends across the groove 29 and all along it and which is in rearwardly offset relation to the flat front surface of the remainder of that head. The web 31 is only about as thick as the flashing that connects the pin and the grommet head in the fastener unit as initially molded. In that unit, the front end surface 32 of the pin stem 13 is flush with the front surface of the web 31; hence, as explained hereinafter, the coplanar surfaces of the web 31 and the pin stem 13 can be defined by a single mold element which is movable laterally and which cores out the groove 29, so that there is no need for an axially movable core to define a hole in the grommet head through which the pin stem passes.

Notwithstanding the radial groove 29 in the grommet head and the thinness of the web 31 which that groove defines, the grommet head 6 is effectively in one rigid piece that completely surrounds the pin stem, and it is therefore capable of affording stable axial guidance to the pin after the flashing is broken.

Another feature that confines the pin to axial movement between its preassembled and its operative positions is that, as seen in cross-section, the stem 13 of the pin is formed with a lateral offset that defines a pair of ridge surfaces 33 which face in opposite lateral directions and extend along its full length. The inner surface of each leg 9 of the grommet is formed with a substantially complementary lateral offset, defining a ridge 34 that opposes the adjacent ridge 33 on the pin. The ridge 34 on each grommet leg extends forwardly along it only to the cam surface 21 on the front portion of the leg, which is substantially flat across the width of the leg and is inclined forwardly and towards the other leg. At one side of the ridge 34 on each grommet leg the leg has a radially outwardly offset inner surface 35 that is substantially coplanar with its cam surface 21 and extends rearwardly along the leg from that cam surface to the detent lug 25 on the leg; and from the lug that surface continues rearwardly in substantially parallel relation to the axis of the shank. At the other side of the ridge 34 the leg has a radially inwardly offset surface 36 which extends all the way back along it from the cam surface 21 and which is parallel to the axis of the shank.

Apparatus for molding initially one-piece fasteners of this invention comprises a generally conventional molding machine (FIGS. 16-19) having complementary die members 40, 41 that are respectively fixed to a stationary platen 42 and to a platen 43 that is movable in opposite mold-closing and mold-opening directions, towards and from the fixed platen 42. As is conventional, the machine has several sets of die members attached to its platens 42 and 43, defining a number of die cavities for producing a corresponding number of fastener units in each operating cycle. The machine also has the usual injection mechanism 45, gates 46 through which molten plastic flows from the injector to the die cavities, and channels 47 through which cooling water is circulated after each injection.

The complementary die members 40, 41 (FIGS. 20-23) of each mold-defining pair part on a plane which contains the axis of the fastener and which intersects both legs 9 of the grommet shank along the longitudinal centerline of the ribs 19 on those legs. To facilitate making the die members 40, 41, each of them comprises two rigidly connected parts 40a, 40b and 41a, 41b, respectively. In each case, one of these parts 40a, 41a defines a longitudinal half of all of that part of the fastener unit that is in front of the front surface of the grommet head, and the other part 40b, 41b defines the remainder of that longitudinal half of the unit.

As can be seen from FIGS. 20-23, the stem 13 of the pin 8 is defined by cavity portions 13', 13" in the respective die members 40, 41 that are in laterally offset relation to one another when the mold is closed. The ridge surfaces 33 along the pin stem are thus defined by parting plane surfaces of the die members. In like manner, each of the die members has a male or core portion 20', 20" in its cavity that defines the slot 20 between the grommet legs, and when the mold is closed these male portions are in laterally offset relation to one another to define the ridge surfaces 34 on the grommet legs.

Figure 24:
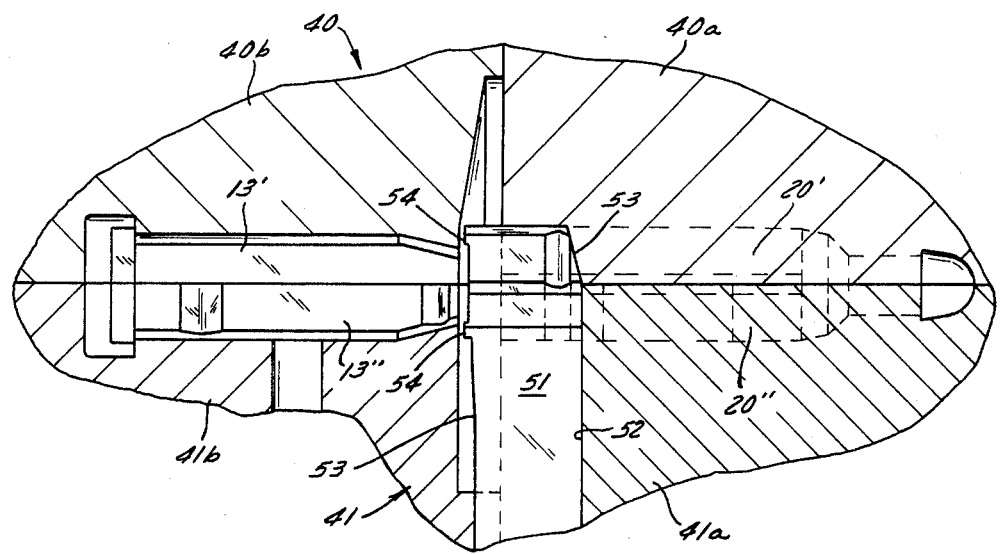
FIG. 24 is a view in longitudinal section through the complete, closed mold for producing a fastener, taken on a plane substantially corresponding to that of FIG. 6.
Figure 25:
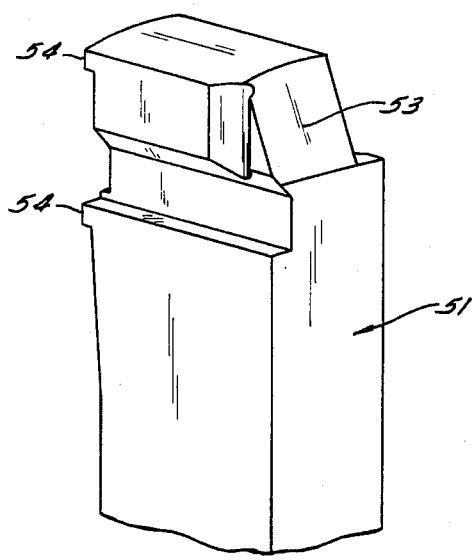
FIGS. 25 and 26 are perspective views of the combined core element and ejector of the molding apparatus of this invention, as seen from opposite sides thereof.
Figure 26:
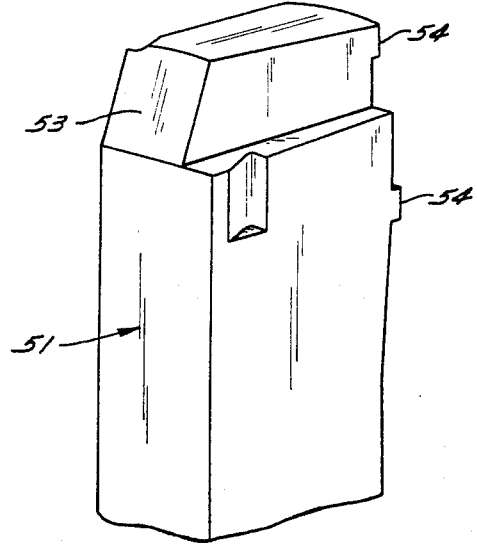

Cooperating with the die members 40 and 41 is an elongated core element 51 that is lengthwise movable, both with the movable die member 41 and relative to it, in the mold-opening and mold-closing directions. Along most of its length this core element is guidingly confined in a slot 52 in the movable die member 41, for lengthwise movement between a molding position, shown in FIGS. 16 and 24, and an ejecting position shown in FIG. 17. When the mold is closed, the front end portion of the core element 51 defines the groove 29 in the grommet head, the front end surface 32 of the pin stem, the detent lugs 25, and the rearmost portion of the slot 20 in the grommet shank.

Following an injection, as the movable platen 43 moves away from the fixed platen 42 to its mold open position, carrying with it the movable die member 41, the core element 51 initially moves along with that die member. The portion of the core element 51 that is in the die cavity has a very slight rearward inclination along its length, as best seen at 53 in FIG. 24, and has very small rearward projections 54, so that it cooperates with the head-forming portion of the cavity in the movable die member 41 to retain the molded piece in that die member and thus draw the piece out of the cavity in the stationary die member 40 as the movable die member separates from the stationary one.

When the movable platen 43 arrives at a position (shown in FIG. 17) at which the movable die member 41 and the molded piece therein are well clear of the stationary die member, an ejector mechanism 57 is actuated to move the core element 51 and a pair of ejector pins 59, 60 in the direction towards the stationary die member. During this motion of the ejector mechanism 57 the movable die member 41 remains stationary in its mold-open position, and therefore the core element 51 and the ejector pins 59, 60 cooperate to dislodge the molded piece from the cavity of the movable die member 41. However, once the molded piece is substantially out of that cavity, the core element 51 stops its movement in the mold closing direction, but the ejector pins 59, 60 continue to move in that direction, to disengage the piece from the core element. Thus clear of all parts of the molding machine, the piece drops down between the die members to be collected for transfer to a machine (not shown) at which the pin 8 is driven partway forward in the grommet to its preassembled position.

The ejector mechanism 57 comprises a platen-like carrier 61 which is guided for motion in the mold-opening and mold-closing directions and to which the ejector pins 59, 60 are fixed. The ejector pins extend through guide bores in the movable die member 41 that open to its cavity. One ejector pin 59 engages the stem 13 of the fastener pin, about midway along its length, and the other ejector pin 60 engages the bullet nose 14 on the pilot.

The core element 51 is connected with an elongated actuator 62 that has an abutment head 63 on its front end which is hooked into the rear portion of the core element and which is received in a chamber 64 in the movable die member. To define limits of lengthwise motion of the core element 51 relative to the movable die member 41, opposite surfaces on the abutment head 63 of the actuator engage opposite end surfaces of the chamber 64. At its rear end the actuator 62 has a plunger head 65 that bears against the front coil of a compressible spring 66. The rearmost coil of the spring 66 is engaged against a spring seat formed in a cylinder-like spring chamber 67 on the platen-like carrier 61. Hence, as the carrier 61 is moved in the mold-closing direction relative to the movable die member 41, its motion is initially transmitted to the core element 51 through the spring 66 and the actuator 62, so that the core element is compelled to move forward with that carrier and the ejector pins 59, 60; but when the core element actuator 62 reaches its front limit of travel, defined by engagement of its abutment head 63 against the front end of the chamber 64, continued forward movement of the carrier 62 (and the ejector pins connected with it) merely results in compression of the spring 66.

During mold-closing motion of the movable die member 41, the abutment head 63 on the core element actuator 62 is engaged by the rear end of the chamber 64 to reestablish the core element 51 in its position for molding.

From the foregoing description taken with the accompanying drawings, it will be apparent that this invention provides a two-piece plastic fastener which has a bullet-nose pilot portion connecting the front ends of the legs of its grommet shank, to guide it into more or less aligned holes in workpieces that it is to connect, and which has a grommet head that is circumferentially rigid and integral, to afford good, stable guidance for its pin, but which is nevertheless capable of being molded in one piece by means of molding equipment having mold parts that move only in one pair of opposite directions.

What is claimed as the invention is:

1. As an article of manufacture, a one-piece molded plastic fastener (F) comprising: a grommet (5), a pin (8) insertable into said grommet (5), and an integral frangible web (31) securing said grommet (5) and pin (8) together;

said grommet (5) comprising a head (6) having a front surface and a rear surface and a pair of laterally spaced apart resilient legs (9) projecting forwardly from said front surface, said head (6) having a groove (29) in said front surface that extends radially inwardly from the periphery of said head (6) and defines a pin-receiving hole in said head (6), said hole having a rear end, said head (6) having a wall portion defining the rear side of said groove (29) and bridging said groove (29), said (9) legs having a pin-receiving slot (20) of predetermined width and depth between them which is open at its sides and communicates with said pin-receiving hole in said head (6), said groove (29) being at least as wide as said slot (20) and extending radially inwardly from the periphery of said head (6) beyond the depth of said slot (20), said pin (8) having a front end surface (32) which defines a portion of said rear end of said pin-receiving hole in said head;

said frangible web (31) being thinner than either of said head (6) and said wall portion and extending between and integral with said head (6) and said pin (8), said web (31) having a rear surface which is complanar with the rear side of said wall portion and with a portion of said rear surface of said head (6), said web having a front surface which is coplanar with said front end surface (32) of said pin (8) and defines another portion of said rear end of said pin-receiving hole in said head (6).

2. The one-piece fastener of claim 1 wherein said web extends substantially all around the pin.

3. The one-piece fastener of claim 1, further characterized by:

C. a substantally U-shaped pilot on the grommet, having legs integrally connected with the front ends of said legs of the grommet and projecting convergently forwardly from them and having a forwardly tapering bight portion.

4. The one-piece fastener of claim 1, further characterized by:

C. said pin having a pair of oppositely facing ridge surfaces thereon, one extending along each of a pair of opposite sides thereof; and D. each of said legs of the grommet having a lengthwise extending ridge surface for opposing engagement with one of said ridge surfaces on the pin, the several ridge surfaces being arranged for cooperation in confining the pin to lengthwise motion in said slot.

* * * * *